(12) United States Patent
Kang

(10) Patent No.: US 9,174,747 B2
(45) Date of Patent: Nov. 3, 2015

(54) SMART HELIPAD FOR SUPPORTING LANDING OF VERTICAL TAKEOFF AND LANDING AIRCRAFT, SYSTEM INCLUDING THE SMART HELIPAD, AND METHOD OF PROVIDING THE SMART HELIPAD

(71) Applicant: Electronics and Telecommunications Research Institute, Daejeon (KR)

(72) Inventor: Hyun Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 176 days.

(21) Appl. No.: 14/025,196

(22) Filed: Sep. 12, 2013

(65) Prior Publication Data

US 2014/0070052 A1    Mar. 13, 2014

(30) Foreign Application Priority Data

Sep. 13, 2012 (KR) .......................... 10-2012-0101414

(51) Int. Cl.
| | |
|---|---|
| B64F 1/00 | (2006.01) |
| B64F 1/36 | (2006.01) |
| E01F 3/00 | (2006.01) |
| B64F 1/18 | (2006.01) |

(52) U.S. Cl.
CPC .. *B64F 1/18* (2013.01); *B64F 1/007* (2013.01)

(58) Field of Classification Search
CPC .............. B64F 1/18; B64F 1/20; B64F 1/007; E01F 3/00
See application file for complete search history.

(56) References Cited

U.S. PATENT DOCUMENTS

| | | | |
|---|---|---|---|
| 3,948,467 A * | 4/1976 | Krusius | 244/116 |
| 4,834,321 A * | 5/1989 | Granger | 244/110 E |
| 5,799,900 A | 9/1998 | McDonnell | |
| 7,025,014 B1 | 4/2006 | Forgach et al. | |
| 7,040,247 B2 * | 5/2006 | Chouery | 114/261 |
| 7,152,547 B1 * | 12/2006 | Hovland | 114/261 |
| 7,335,067 B2 | 2/2008 | Lee et al. | |
| 7,398,946 B1 | 7/2008 | Marshall | |
| 8,051,791 B2 * | 11/2011 | Hovland et al. | 114/261 |
| 8,554,395 B2 * | 10/2013 | Andersson | 701/16 |
| 8,608,107 B2 * | 12/2013 | Martensson et al. | 244/114 R |
| 8,918,234 B2 * | 12/2014 | Covington et al. | 701/3 |
| 2005/0125142 A1 * | 6/2005 | Yamane | 701/200 |
| 2011/0024559 A1 | 2/2011 | McGeer et al. | |
| 2013/0099054 A1 * | 4/2013 | Besenzoni | 244/110 E |

FOREIGN PATENT DOCUMENTS

KR    10-2010-0027747 A    3/2010

* cited by examiner

*Primary Examiner* — Philip J Bonzell

(57) ABSTRACT

Provided is a method of providing a smart helipad configured to support landing of a vertical takeoff and landing aircraft, the method including adaptively displaying an imaged marker recognizable by a camera mounted to the vertical takeoff and landing aircraft; obtaining tilting information about a ground surface and a sea surface using a gyro sensor; and adjusting a landing pad connected to a display unit on which the marker is displayed to be in parallel with a horizontal line based on the tilting information, using a motion platform having change responsiveness to all of the directions.

13 Claims, 6 Drawing Sheets

FIG. 2
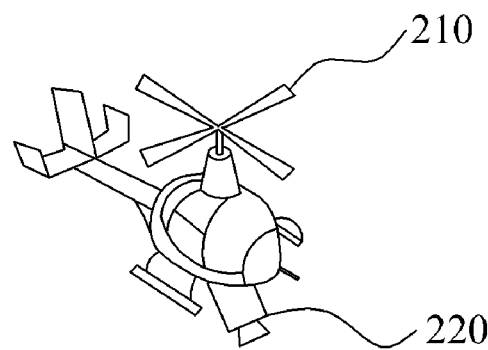
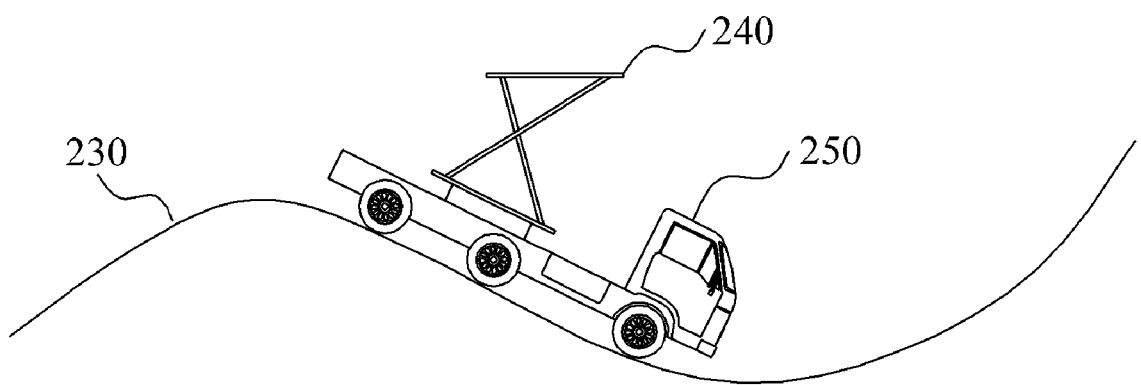

FIG. 3
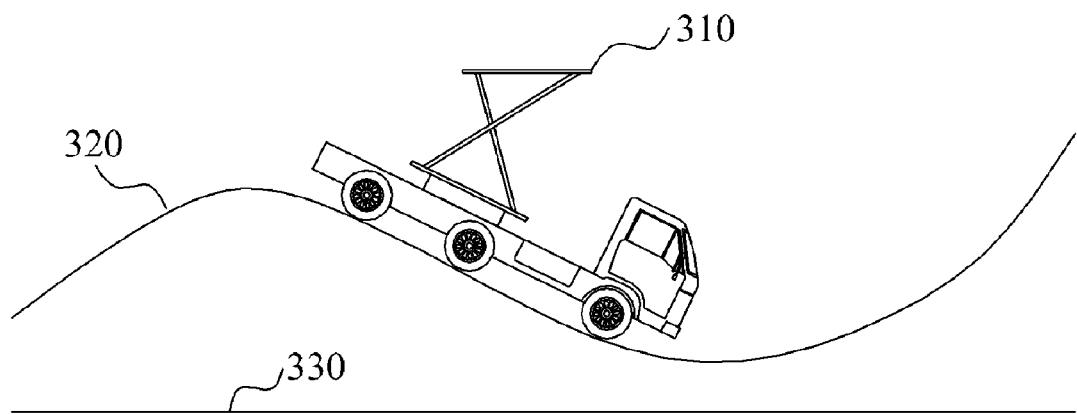
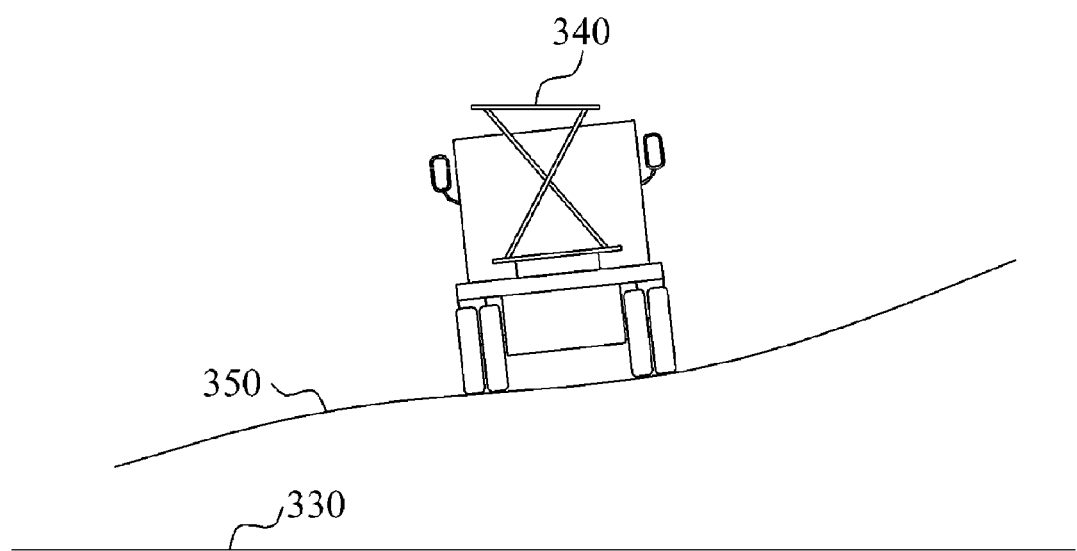

SMART HELIPAD FOR SUPPORTING LANDING OF VERTICAL TAKEOFF AND LANDING AIRCRAFT, SYSTEM INCLUDING THE SMART HELIPAD, AND METHOD OF PROVIDING THE SMART HELIPAD

CROSS-REFERENCE TO RELATED APPLICATION

This application claims the priority benefit of Korean Patent Application No. 10-2012-0101414, filed on Sep. 13, 2012, in the Korean Intellectual Property Office, the disclosure of which is incorporated herein by reference.

BACKGROUND

1. Field of the Invention

The present invention relates to a smart helipad configured to support landing of a vertical takeoff and landing aircraft, a system including the smart helipad, and a method of providing the smart helipad, and more particularly, to a technology regarding a smart helipad configured to support landing of a vertical takeoff and landing aircraft using a camera mounted to the vertical takeoff and landing aircraft and a motion platform.

2. Description of the Related Art

A helipad providing technology in a helipad system that supports landing of a vertical takeoff and landing aircraft refers to a technology that provides a planar landing pad having a predetermined size sufficient to enable landing of the vertical takeoff and landing aircraft. Accordingly, a system including such helipad may be installed in, for example, a land, a building, a mountain, a vehicle, and a ship.

SUMMARY

Embodiments of the present invention provide a method, apparatus, and system including a smart helipad configured to support landing of a vertical takeoff and landing aircraft.

Also, embodiments of the present invention provide a method, apparatus, and system that may be applicable to a vehicle and a ship of which horizontality at a landing point varies.

Also, embodiments of the present invention provide a method, apparatus, and system that may adjust a landing pad to be in parallel with a horizontal line so that the landing pad may have change responsiveness to all of the directions.

Also, embodiments of the present invention provide a method, apparatus, and system that may display a marker of a landing pad using a camera mounted to a vertical takeoff and landing aircraft so that the marker of the landing pad may be accurately recognized.

According to an aspect of the present invention, there is provided a method of providing a smart helipad configured to support landing of a vertical takeoff and landing aircraft, the method including: adaptively displaying an imaged marker recognizable by a camera mounted to the vertical takeoff and landing aircraft; obtaining tilting information about a ground surface and a sea surface using a gyro sensor; and adjusting a landing pad connected to a display unit on which the marker is displayed to be in parallel with a horizontal line based on the tilting information, using a motion platform having change responsiveness to all of the directions.

The adjusting may include changing a posture and a position of the landing pad with quick adjustment responsiveness to each axis of the motion platform.

The adaptively displaying may include adaptively displaying the marker based on a height of the vertical takeoff and landing aircraft and a resolution of the camera mounted to the vertical takeoff and landing aircraft.

The obtaining may include obtaining tilting deviation information about the ground surface and the sea surface using the gyro sensor; and updating the tilting deviation information to the motion platform.

The helipad providing method may further include collecting information about the vertical takeoff and landing aircraft.

According to another aspect of the present invention, there is provided a system including a smart helipad, the system including a display unit; a motion platform unit; and a controller. The controller may obtain tilting information about a ground surface and a sea surface using a gyro sensor.

The motion platform unit may include a motion a motion platform, and may adjust a landing pad connected to the display unit on which a marker is displayed to be in parallel with a horizontal line based on the tilting information, using the motion platform having change responsiveness to all of the directions.

The motion platform unit may change a posture and a position of the landing pad with quick adjustment responsiveness to each axis of the motion platform.

The display unit may include a landing pad, and may adaptively display an imaged marker recognizable by a camera mounted to the vertical takeoff and landing aircraft.

The display unit may adaptively display the marker based on a height of the vertical takeoff and landing aircraft and a resolution of the camera mounted to the vertical takeoff and landing aircraft.

The display unit may include at least one of a display panel including a light emitting diode (LED), a projector, a plasma display panel (PDP), and a display panel including a liquid crystal display (LCD).

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a view to describe a system including a smart helipad configured to support landing of a vertical takeoff and landing aircraft according to an embodiment of the present invention;

FIG. 3 is a view to describe the helipad of FIG. 2 adjusted to be in parallel with a horizontal line according to an embodiment of the present invention;

DETAILED DESCRIPTION

Figure 1:
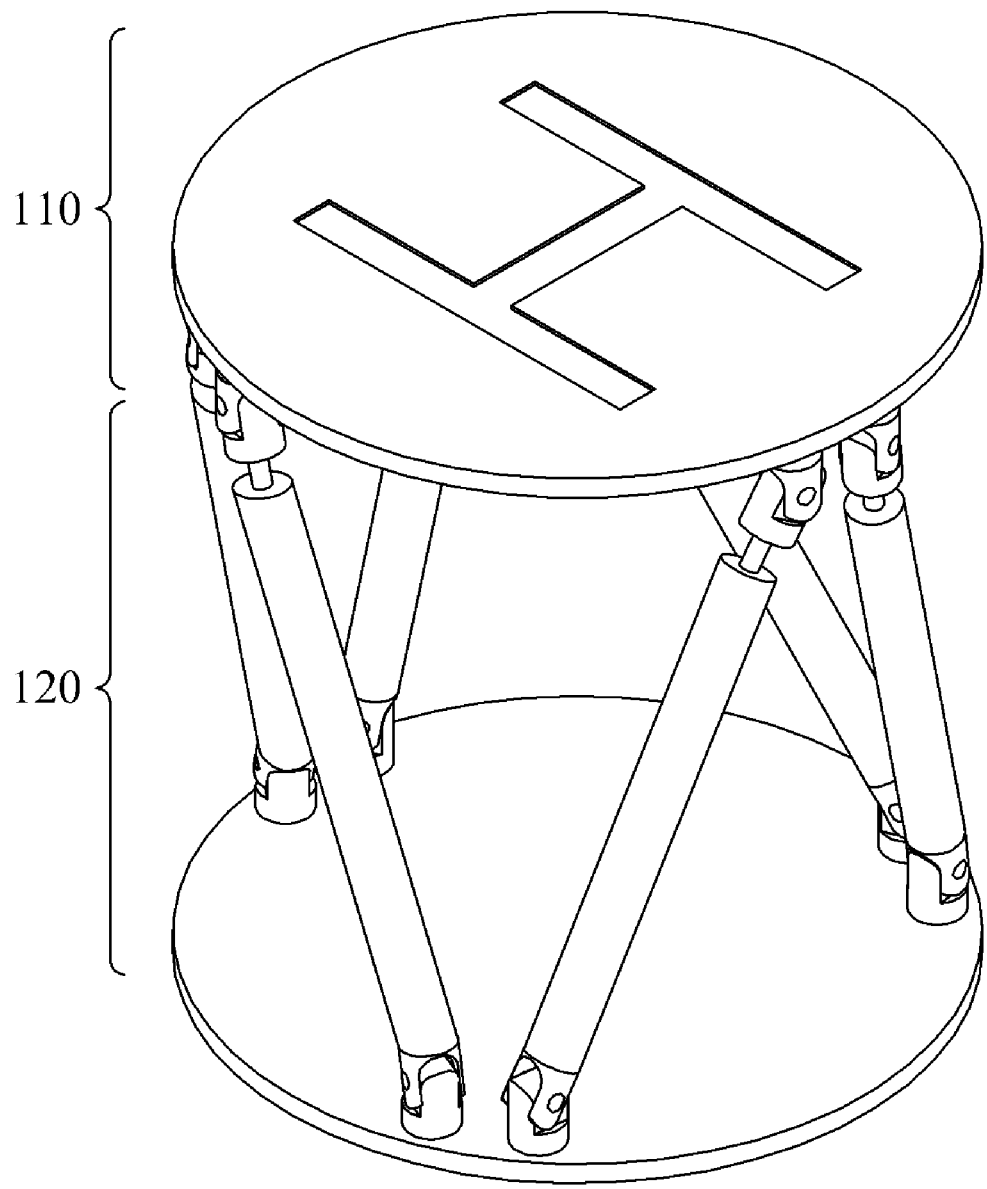
FIG. 1 illustrates a smart helipad configured to support landing of a vertical takeoff and landing aircraft according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a smart helipad configured to support landing of a vertical takeoff and landing aircraft according to an embodiment of the present invention. Here, the smart helipad may support both manual landing and automatic landing of the vertical takeoff and landing aircraft.

Referring to FIG. 1, the smart helipad may include a display unit 110 and a motion platform unit 120.

The display unit 110 may include a display panel that serves to adaptively display an imaged marker and a landing pad that serves as a landing plate of an aircraft. Here, the display panel may include a projector in addition to a large display including a plasma display panel (PDP), a liquid crystal display (LCD), a light emitting diode (LED), and an organic LED (OLED). For example, when the project is used to display the imaged marker, a punching plate may be used as the display panel and the landing pad. Specifically, to display the imaged marker while minimizing a vortex phenomenon between landing pads, it is possible to directly attach a miniaturized LED element to the punching plate and thereby use the same.

Using a motion platform having change responsiveness to all of the directions, the motion platform unit 120 may have quick responsiveness to each control axis of the motion platform and thus, may adjust the landing pad to be in parallel with a horizontal line regardless of a tilting of a ground surface and a sea surface. Here, the horizontal line refers to a plane perpendicular to a gravity direction and thus, indicates a constant direction at all times regardless of a tilting state of the ground surface and the sea surface.

The motion platform may employ a stewart platform. The stewart platform refers to a device that guarantees degree of freedom with respect to six parameters, for example, positions X, Y, and Z, and postures Ø, θ, and φ of an upper plate. The stewart platform may set a position and a posture of the upper plate to be in a desired horizontal state.

Also, the smart helipad configured to support landing of the vertical takeoff and landing aircraft according to an embodiment of the present invention may employ a three-axial posture control motion platform that replaces the stewart platform. That is, as described above, if the landing pad is capable of having change responsiveness to all of the directions, any type of motion platform devices may be applied to the motion platform unit 120.

FIG. 2 is a view to describe a system including a smart helipad configured to support landing of a vertical takeoff and landing aircraft according to an embodiment of the present invention.

The system including the smart helipad configured to support landing of the vertical takeoff and landing aircraft may include a helipad that is configured to support manual landing and automatic landing of the vertical takeoff and landing aircraft.

Referring to FIG. 2, the system including the smart helipad configured to support landing of the vertical takeoff and landing aircraft may include a vertical takeoff and landing aircraft 210, a camera 220 mounted to the vertical takeoff and landing aircraft 210, a vehicle 250 driving on a ground surface 230, and a helipad 240 mounted to the vehicle 250.

The vertical takeoff and landing aircraft 210 may include a small unmanned helicopter capable of performing vertical takeoff and landing, such as a helicopter, and the camera 220 mounted to the vertical takeoff and landing aircraft 210 may be an image recognition device capable of recognizing an imaged marker.

The imaged marker recognizable by the camera 220 mounted to the vertical takeoff and landing aircraft 210 may be displayed on a display unit of the helipad 240 mounted to the vehicle 250 driving on the ground surface 230.

Here, the marker may be adaptively displayed based on a height of the vertical takeoff and landing aircraft 210 and a resolution of the camera 220 mounted to the vertical takeoff and landing aircraft 210. A description related thereto will be made with reference to FIG. 4.

A controller of the helipad 240 may obtain tilting deviation information about the ground surface 250 using a gyro sensor, and may adjust a landing pad of the helipad 240 to be in parallel with a horizontal line perpendicular to a gravitation direction by updating the titling gravitation information to a motion platform. Here, a stewart platform may be used for the motion platform in order to have change responsiveness to all of the directions. A further detailed description related thereto will be made with reference to FIG. 3.

The controller of the helipad 240 may collect information about the vertical takeoff and landing aircraft 210, and may control and manage the marker displayed on the display unit and the motion platform.

The ground surface 230 in a winding shape may be a sea surface, and the vehicle 250 may be a vessel or a ship to which the helipad 240 may be mounted.

FIG. 3 is a view to describe the helipad 240 of FIG. 2 adjusted to be in parallel with a horizontal line according to an embodiment of the present invention.

FIG. 3 illustrates an example of a side situation of a helipad (1) 310 mounted to a vehicle driving on a winding ground surface (1) 320, and an example of a rear situation of a helipad (2) 340 mounted to a vehicle driving on a ground surface (2) 350.

In FIG. 3, the ground surface (1) 320 and the ground surface (2) 350 are an identical ground surface, and the helipad (1) 310 and the helipad (2) 340 mounted to the same vehicle are also an identical helipad.

As illustrated in FIG. 3, the ground surface (1) 320 and the ground surface (2) 350 on which the vehicle is driving are also winding from perspective of side and rear. In response thereto, the helipad (1) 310 and the helipad (2) 340 that are a smart helipad according to the present invention may have quick responsiveness to each axis of a motion platform by employing, as the motion platform, a stewart platform having change responsiveness to all of the directions.

For example, a vehicle mounted with a smart helipad, for example, the helipad (1) 310 and the helipad (2) 340, is driving on a ground surface, for example, the winding ground surface (1) 320 and ground surface (2) 350, which is tilted in a variety of directions including back and forth, and left and right, the smart helipad may obtain tilting deviation information about the variety of directions and may update the obtained titling deviation information to a motion platform, thereby adjusting a landing pad of the smart pad.

Although the winding ground surface, for example, the winding ground surface (1) 320 and ground surface (2) 350, is replaced with a sea surface that keeps flexibly moving by waves, the motion platform of the present invention may adjust the landing pad to be in parallel with a horizontal line, for example, a ground surface (1) 330 and a ground surface (2) 360.

Figure 4:
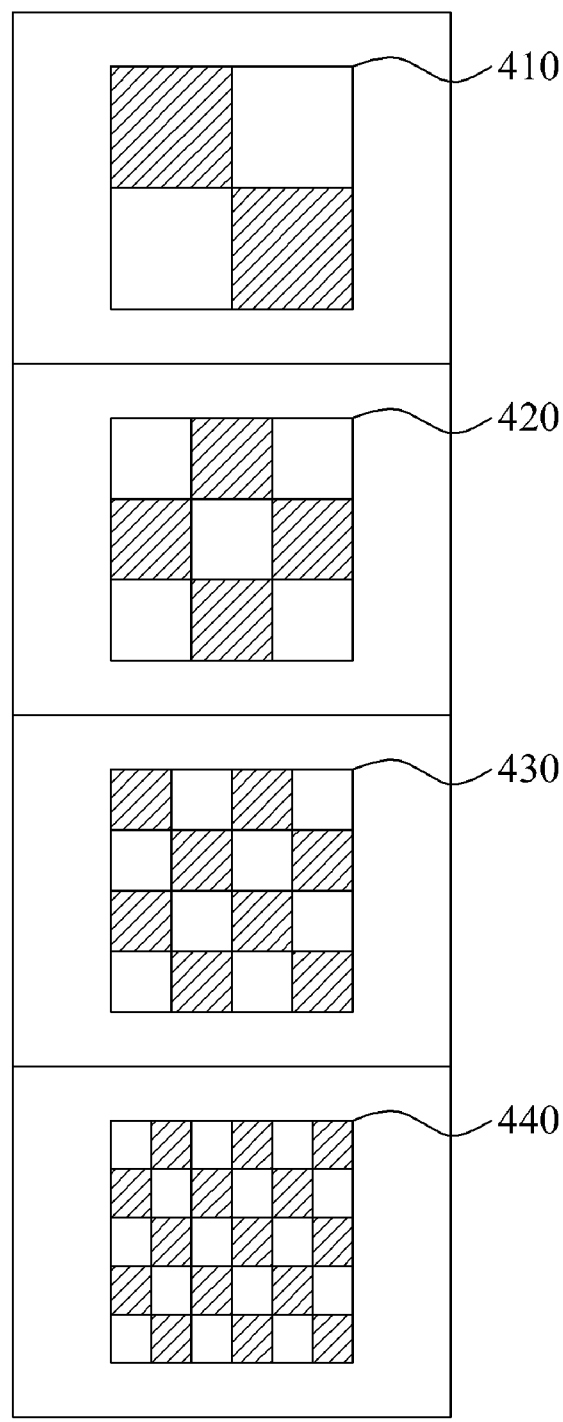
FIG. 4 illustrates examples of a marker of the helipad of FIG. 2.

FIG. 4 illustrates examples of a marker of the helipad 240 of FIG. 2.

FIG. 4 illustrates a marker (1) 410, a marker (2) 420, a marker (3) 430, and a marker (4) 440 that are displayed based on a height of a vertical takeoff and landing aircraft and a resolution of a camera mounted to the vertical takeoff and landing aircraft.

A system including a smart helipad according to the present invention may adaptively display an imaged marker recognizable by the camera mounted to the vertical takeoff and landing aircraft on a display unit, based on the height of the vertical takeoff and landing aircraft and the resolution of the camera.

As an example, when a flight height, that is, altitude of the vertical takeoff and landing aircraft is high, the system may display a marker in a simplified pattern, as shown in the marker (1) 410. When the altitude of the vertical takeoff and landing aircraft is low, the system may display a marker in a further detailed and embodied pattern, as shown in the marker (4) 440.

As another example, a marker may be displayed in an order of the marker (1) 410, the marker (2) 420, the marker (3) 430, and the marker (4) 440, based on the height of the vertical takeoff and landing aircraft.

Also, a marker may be displayed in a predetermined pattern, and may be adaptively changed based on the height of the vertical takeoff and landing aircraft and the resolution of the camera and thereby be displayed using at least one of a display panel including an LED, a projector, a PDP, and a display panel including an LCD.

Figure 5:
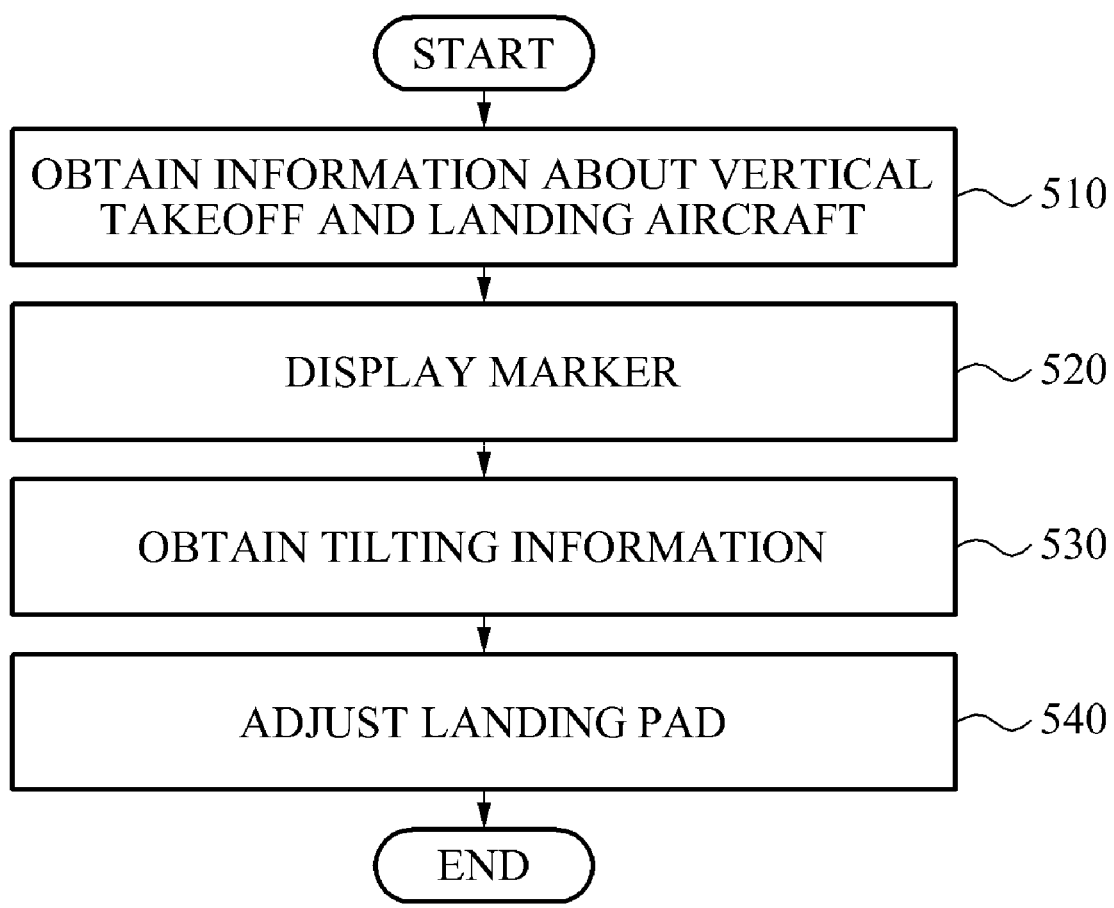
FIG. 5 is a flowchart illustrating a method of providing a smart helipad configured to support landing of a vertical takeoff and landing aircraft according to an embodiment of the present invention.

FIG. 5 is a flowchart illustrating a method of providing a smart helipad configured to support landing of a vertical takeoff and landing aircraft according to an embodiment of the present invention.

In operation 510, information about the vertical takeoff and landing aircraft may be obtained through an open data link. Here, information about the vertical takeoff and landing aircraft may include height information of the vertical takeoff and landing aircraft and resolution information of a camera mounted to the vertical takeoff and landing aircraft.

In operation 520, an imaged marker recognizable by the camera mounted to the vertical takeoff and landing aircraft may be adaptively displayed on a display unit, based on the obtained information.

In operation 530, tilting information about a ground surface and a sea surface may be obtained using a gyro sensor.

In operation 540, a landing pad connected to the display unit on which the marker is displayed may be adjusted to be in parallel with a horizontal line using a motion platform having change responsiveness to all of the directions, based on the obtained tilting information. Here, although a stewart platform is employed for the motion platform as an example, other motion platforms supportable to have change responsiveness to all of the directions may be employed.

Figure 6:
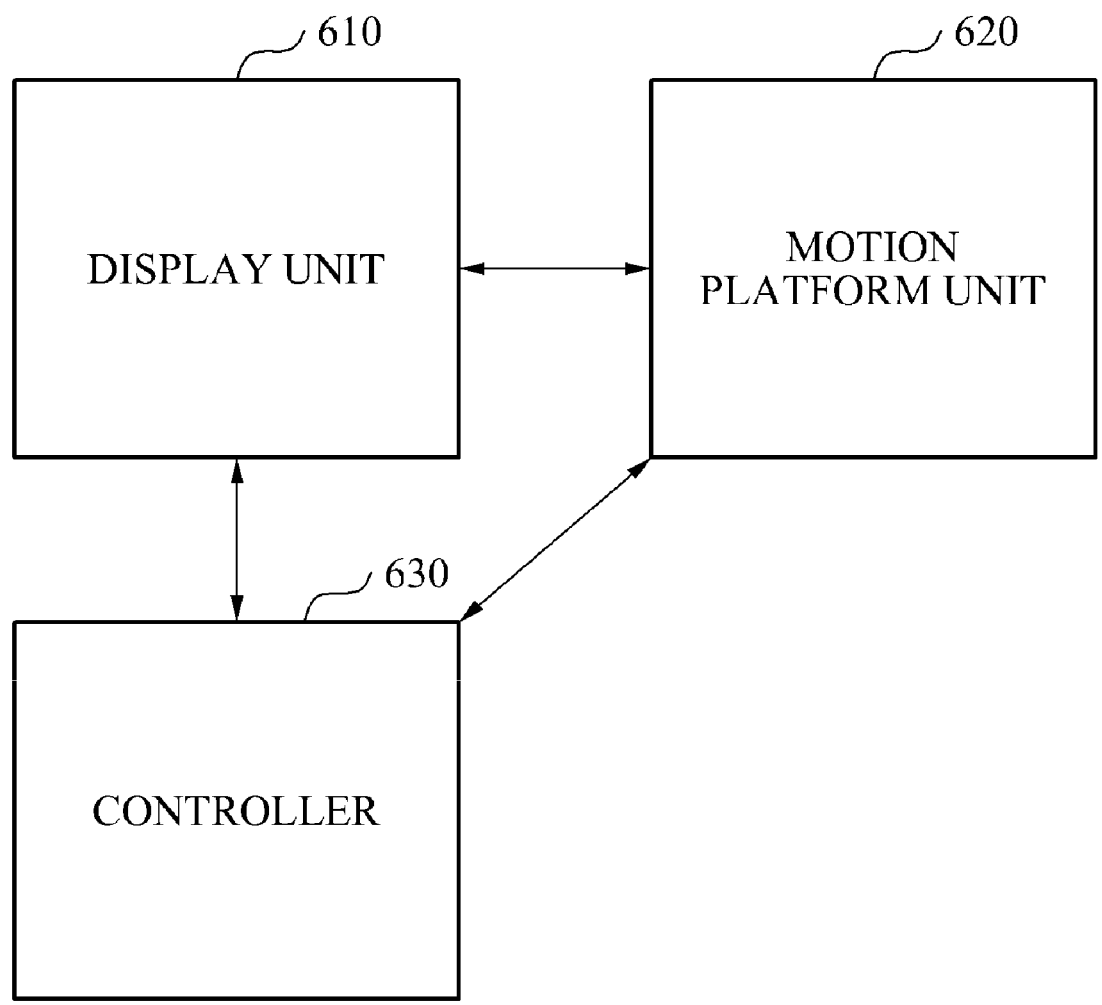
FIG. 6 is a block diagram illustrating a system including a smart helipad configured to support landing of a vertical takeoff and landing aircraft according to an embodiment of the present invention.

FIG. 6 is a block diagram illustrating a system including a smart helipad configured to support landing of a vertical takeoff and landing aircraft according to an embodiment of the present invention.

Referring to FIG. 6, the system including the smart helipad may include a display unit 610, a motion platform unit 620, and a controller 630.

The controller 630 may obtain tilting information about a ground surface and a sea surface using a gyro sensor.

The display unit 610 may include a landing pad, and may adaptively display an imaged marker recognizable by a camera mounted to the vertical takeoff and landing aircraft. Here, the display unit 610 may adaptively display the marker based on a height of the vertical takeoff and landing aircraft and a resolution of the camera mounted to the vertical takeoff and landing aircraft.

The motion platform unit 620 may include a motion platform, and may adjust the landing pad connected to the display unit 610 on which the marker is displayed to be in parallel with a horizontal line using the motion platform having change responsiveness to all of the directions. Here, the motion platform unit 620 may change a posture and a position of the landing pad with quick adjustment responsiveness to each axis of the motion platform.

According to embodiments of the present invention, there may be provided a method, apparatus, and system including a smart helipad configured to support landing of a vertical takeoff and landing aircraft.

Also, according to embodiments of the present invention, there may be provided a method, apparatus, and system that may be applicable to a vehicle and a ship of which horizontality at a landing point varies.

Also, according to embodiments of the present invention, there may be provided a method, apparatus, and system that may adjust a landing pad to be in parallel with a horizontal line so that the landing pad may have change responsiveness to all of the directions.

Also, according to embodiments of the present invention, there may be provided a method, apparatus, and system that may display a marker of a landing pad using a camera mounted to a vertical takeoff and landing aircraft so that the marker of the landing pad may be accurately recognized.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a smart helipad configured to support landing of a vertical takeoff and landing aircraft, the method comprising:
adaptively generating and displaying an imaged marker by a display panel of a display unit such that the imaged marker displayed on the display unit is recognizable by a camera mounted to the vertical takeoff and landing aircraft, the display panel coupled to a landing pad;
obtaining tilting information about a ground surface or a sea surface using a gyro sensor; and
adjusting a top surface of the landing pad coupled to a motion platform to be in parallel with a horizontal line based on the tilting information, using the motion platform having change responsiveness in all directions, the horizontal line being perpendicular to a gravity direction.

2. The method of claim 1, wherein the obtaining comprises:
obtaining tilting deviation information about the ground surface or the sea surface using the gyro sensor; and
updating the tilting deviation information to the motion platform.

3. The method of claim 1, further comprising:
collecting information about the vertical takeoff and landing aircraft.

4. The method of claim 1, further comprising collecting information on the vertical takeoff and landing aircraft using an open data link.

5. The method of claim 1, wherein the adaptively generating and displaying comprises adaptively generating and displaying the imaged marker based on a distance of the vertical takeoff and landing aircraft from the display panel and a resolution of the camera mounted to the vertical takeoff and landing aircraft.

6. The method of claim 5, wherein the imaged marker is adaptively generated and displayed such that a number of pixels of the imaged marker increases as the distance of the vertical takeoff and landing aircraft from the display panel decreases.

7. A system comprising a smart helipad, the system comprising:
a display unit including a display panel and a landing pad coupled to the display panel, the display panel adaptively generating and displaying an imaged marker;
a motion platform unit including a motion platform to which the landing pad is coupled, the motion platform adjusting the landing pad in all directions such that a top surface of the landing pad is in parallel with a horizontal line based on tilting information about a ground surface or a sea surface, the horizontal line being perpendicular to a gravity direction; and
a controller,
wherein the controller obtains the tilting information using a gyro sensor.

8. The system of claim 7, wherein the motion platform comprises a Stewart platform.

9. The system of claim 7, wherein the controller collects information on the vertical takeoff and landing aircraft using an open data link.

10. The system of claim 7, wherein the display panel adaptively generates and displays the imaged marker such that the imaged marker is recognizable by a camera mounted to a vertical takeoff and landing aircraft.

11. The system of claim 10, wherein the display panel comprises at least one of a light emitting diode (LED), a projector, a plasma display panel (PDP), and a liquid crystal display (LCD).

12. The system of claim 10, wherein the display panel adaptively generates and displays the imaged marker based on a distance of the vertical takeoff and landing aircraft from the display panel and a resolution of the camera mounted to the vertical takeoff and landing aircraft.

13. The system of claim 12, wherein the display panel adaptively generates and displays the imaged marker such that a number of pixels of the imaged marker increases as the distance of the vertical takeoff and landing aircraft from the display panel decreases.

* * * * *